(12) United States Patent
Dzeparoska et al.

(10) Patent No.: US 12,518,005 B2
(45) Date of Patent: Jan. 6, 2026

(54) THREAT DETECTION AND MITIGATION IN A NETWORKED ENVIRONMENT

(71) Applicant: The Toronto-Dominion Bank, Toronto (CA)

(72) Inventors: Kristina Dzeparoska, Toronto (CA); Rachel L. Clark, Gravenhurst (CA)

(73) Assignee: The Toronto-Dominion Bank, Toronto (CA)

( * ) Notice: Subject to any disclaimer, the term of this patent is extended or adjusted under 35 U.S.C. 154(b) by 503 days.

(21) Appl. No.: 18/079,733

(22) Filed: Dec. 12, 2022

(65) Prior Publication Data

US 2024/0193268 A1    Jun. 13, 2024

(51) Int. Cl.
*G06F 21/55*    (2013.01)

(52) U.S. Cl.
CPC ...... *G06F 21/554* (2013.01); *G06F 2221/033* (2013.01)

(58) Field of Classification Search
CPC .......................... G06F 2221/033; G06F 21/554
See application file for complete search history.

(56) References Cited

U.S. PATENT DOCUMENTS

| | | | |
|---|---|---|---|
| 8,744,894 B2 | 6/2014 | Christiansen et al. | |
| 9,438,626 B1 | 9/2016 | Zilberberg et al. | |
| 9,501,647 B2 | 11/2016 | Yampolskiy et al. | |
| 10,375,104 B1 * | 8/2019 | Wu | H04L 63/1441 |
| 11,349,863 B2 | 5/2022 | Akella et al. | |
| 2024/0095349 A1 * | 3/2024 | Ozugur | G06F 21/554 |

OTHER PUBLICATIONS

U.S. Appl. No. 18/046,748, Clark et al., filed Oct. 14, 2022.

* cited by examiner

*Primary Examiner* — Tod R Swann
*Assistant Examiner* — Daniel Elahian
(74) *Attorney, Agent, or Firm* — Rowand LLP (57) ABSTRACT

One example method includes determining, by a threat detection system and at a first time interval, for an object and based on a first risk score computed for the object, that the object poses a threat to the networked environment. Analyzing threat events used for calculating the first risk score by a trained machine learning model for determining the likelihood that the object poses an actual threat and generating actual threat data based on the likelihood that the object poses an actual threat. In response to receiving the actual threat data, a value of a first counter can be computed based on prior incorrect identification of the object as a threat. A counterweight can be identified based on the value of the first counter. A second risk score for the object can be downscaled, using the identified counterweight to obtain an updated risk score for the object.

17 Claims, 5 Drawing Sheets

THREAT DETECTION AND MITIGATION IN A NETWORKED ENVIRONMENT

TECHNICAL FIELD

The present disclosure generally relates to computer-implemented methods, software, and systems for threat detection and mitigation in networked environments and further relates to accurate threat detection by reducing the occurrence of false positive threat alerts triggered for objects in the networked environment.

BACKGROUND

Modern computer systems and networks seek to address and protect themselves from numerous threats that are designed to infiltrate and/or compromise the security of these systems and networks. Examples of such threats include, among others, viruses, ransomware, and malicious actors attempting to gain unauthorized access to computer systems and networks.

Threat detection systems generally employ a risk score for each object (e.g., an endpoint) of the network to determine and detect potential threats to, e.g., networked environments, from these objects. In general, the risk score is directly correlated with the likelihood that a threat is present. So, for example, a high risk score indicates a high likelihood of the presence of a threat, whereas a low risk score indicates a low likelihood of the presence of a threat. In addition, such threat detection systems generally rely on whitelists to keep track of the objects that are likely trustworthy and stop monitoring those objects. For example, an object deemed to be trustworthy can be included on the whitelist. The object which, for example, triggers a certain number of false positive threat alerts (i.e., a risk alert of the object is determined not to be an actual threat) can be included in the whitelist, so the object does not trigger false positive threat alerts any more.

SUMMARY

The present disclosure generally relates to systems, software, and computer-implemented methods for reducing the occurrence of false positive threat alerts triggered by objects in a networked environment and controlling access of the objects to system resources.

A first example method includes determining, by a threat detection system and at a first time interval, for an object that is deployed within a networked environment and based on a first risk score computed for the object, that the object poses a threat to the networked environment. Actual threat data indicating that the object does not pose an actual threat to the networked environment can be received. In response to receiving the actual threat data, a value of a first counter can be computed based on prior incorrect identification of the object as a threat to the networked environment. A counterweight can be identified based on the value of the first counter. A second risk score for the object can be downscaled, using the identified counterweight and at a second time interval, to obtain an updated risk score for the object. Access of the object to system resources can be controlled based on whether the updated risk score satisfies a predetermined risk threshold value.

Implementations can optionally include one or more of the following features.

In some implementations, identifying, based on the value of the first counter, the counterweight includes, in response to receiving the actual threat data, incrementing (1) a value of a second counter and (2) a value of a historical counter that indicates a number of times that the object has been incorrectly identified by the threat detection system as a threat to the networked environment.

In some implementations, the first example method includes computing the value of the first counter by scaling the value of the historical counter by a predetermined value. Whether the value of the second counter satisfies a first threshold and whether the value of the first counter satisfies a second threshold can then be determined.

In some implementations, the first example method includes determining that the value of the second counter satisfies the first threshold and that the value of the first counter satisfies the second threshold. In response to determining that the value of the second counter satisfies the first threshold and that the value of the first counter satisfies the second threshold, a dynamic value can be generated as the counterweight.

In some implementations, the first example method includes determining that the value of the second counter satisfies the first threshold and that the value of the first counter does not satisfy the second threshold. In response to determining that the value of the second counter satisfies the first threshold and that the value of the first counter does not satisfy the second threshold, a static value can be generated as the counterweight.

In some implementations, the first example method includes after identifying the counterweight, resetting the second counter to zero.

In some implementations, controlling access of the object to the system resources based on whether the updated risk score satisfies the predetermined risk threshold value includes determining that the updated risk score satisfies the predetermined risk threshold value. In response to determining that the updated risk score satisfies the predetermined risk threshold value, access to system resources can be granted to the object.

In some implementations, controlling access of the object to the system resources based on whether the updated risk score satisfies the predetermined risk threshold value includes determining that the updated risk score does not satisfy the predetermined risk threshold value. In response to determining that the updated risk score does not satisfy the predetermined risk threshold value, the object can be denied access to the system resources.

In some implementations, downscaling, using the identified counterweight, the second risk score for the object to obtain the updated risk score for the object includes obtaining, from the threat detection system and at the second time interval, the second risk score for the object. The second risk score can then be scaled by the identified counterweight to obtain the updated risk score for the object.

Similar operations and processes associated with each example system can be performed in a different systems comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations can also be contemplated. Additionally, similar operations can be associated with or provided as computer-implemented software embodied on tangible, non-transitory media that processes and transforms the respective data, some or all of the aspects can be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

The techniques described herein can be implemented to achieve the following advantages. For example, in some implementations, the techniques described herein can reduce the false positive threat alerts that are repeatedly generated (by threat detection systems) for certain reliable objects (as that term is further described in this specification) in a networked environment. In some implementations, the techniques described herein can reduce false positive threat alerts generated for certain reliable objects by applying counterweights (e.g., a value less than 1.0) to downscale the risk scores computed for these objects, and as a consequence, reducing the number of false positive threat alerts determined/computed for these objects. Therefore, by applying the techniques described herein, a risk alert is more likely to be a true positive because it is more likely triggered by an unreliable object or a reliable object presenting a threat (e.g., as determined when than object receives a high risk score notwithstanding the applied counterweight).

As another example, in some instances, the techniques described herein can monitor all objects, even if some are likely to be trustworthy, instead of relying on whitelists to exclude such presumed trustworthy objects from monitoring, as generally is the case in whitelist-based threat detection systems. Monitoring all objects present in a networked environment offers more network and computer security than using whitelists because it can prevent scenarios where an object of the whitelist may become compromised and subsequently pose a threat to the networked environment. Meanwhile, by applying counterweight-based techniques described herein to trustworthy objects as described above (and throughout this document), monitoring all objects would not generate excessive false positive threat alerts because some reliable objects are made more difficult to trigger risk alerts.

In this regard, the techniques described herein achieve significant computer and network security benefits. Moreover, the improved computer and network security techniques described herein further result in computing resource efficiencies. For example, current techniques generally result in excessive false positive threat alerts, which can utilize significant quantity of resources stemming from identifying and monitoring those risks, as well as evaluating and investigating those risks further only to determine they are not actual threats. In contrast, the techniques described herein can reduce false positive threat alerts, especially those from reliable objects, which thus reduces or eliminates the need for consuming computing and network resources otherwise required to confirm or ascertain the presence of an actual threat. This in turn can allow faster remediation of the threat via corrective security measures—e.g., before a potential attack is initiated and compromises a portion or all aspects of a secured network environment.

DETAILED DESCRIPTION

The present disclosure generally relates to various tools and techniques associated with monitoring threats posed by objects deployed in a networked environment and in particular, reducing the occurrence of false positive threat alerts computed for objects in the networked environment and controlling access to system resources for objects actually posing a threat to the networked environment.

Threat detection systems generally employ risk scores to determine threat levels of objects and employ whitelists to keep track of the objects that are likely trustworthy and stop monitoring those objects. However, the current approach suffers from multiple deficiencies. First, a high risk score may not indicate an actual threat, in which case a threat alert generated based on the high risk score is considered a false positive. Excessive false positive threat alerts waste significant quantity of resources stemming from identifying and monitoring those risks, as well as evaluating and investigating those risks further only to determine they are not actual threats. Second, the whitelist approach creates significant risks because the objects listed on those whitelists, while trustworthy, can nevertheless become compromised and can pose actual threats to the system.

These deficiencies can be illustrated by the following example. An endpoint operated by a system administrator may perform numerous operations that may be deemed as high risk even though these operations are routine for a system administrator. As a result, the system administrator's endpoint may have a high risk score, despite not actually being a threat actor. The system administrator's endpoint may frequently trigger risk alerts that, upon investigation, are determined to not be actual threats. As such, the system administrator's endpoint can trigger a large number of false positive threat alerts. Since the endpoint of the system administrator triggers a large number of false positive threat alerts, the threat detection system can determine to include the endpoint in a whitelist and thereby, stop monitoring the endpoint. However, after being whitelisted, the endpoint can nevertheless be hacked or otherwise compromised and can thus pose an actual threat to the system. However, by virtue of the endpoint being whitelisted (and thus marked as trustworthy), the endpoint is no longer monitored for threats even though the endpoint subsequently becoming a threat to the networked environment. As the above example illustrates, such threat detection systems are deficient in at least two respects: (1) they create a large number of false positive threat alerts for benign object that waste significant resources for identifying, monitoring, and evaluating such identified threats/risk alerts, or (2) they utilize whitelists to avoid monitoring of certain objects that are presumed trustworthy, even though those objects can subsequently pose actual threats to the computer systems or networks-thus exposing these environments to cybersecurity attacks.

In contrast, the techniques described herein enable to reduce the occurrence of false positive threat/risk alerts triggered by objects in a networked environment. In some implementations, the techniques described herein implement a dynamic counterweight algorithm that downscales the computed risk for a particular object using a static or dynamic counterweight determined as a function of a number of prior false positive threat alerts generated for the object—and by the extension, reduce the number of false positives that may subsequently be generated for the object. At a high level, the counterweight algorithm operates in the following manner. First, a risk scoring formula, as implemented by a threat detection system, is used to compute a risk score for a particular object based on threat events associated with the particular object. If the risk score for the particular object satisfies a condition (e.g., the risk score meets or exceeds a predetermined threshold, e.g., 0.5), the object is deemed to pose a threat to the networked environment. Next, it is determined whether the threat identified by the threat detection system is an actual threat or not, e.g., a human evaluation reveals that the object poses an actual threat or not. In other words, this determination evaluates whether the threat detection system's identification of a threat was a true positive (i.e., an actual threat) or a false positive (i.e., not an actual threat). If the threat identified by the threat detection system is determined not to be an actual threat (i.e., it is a false positive), the algorithm uses one or more counters—that identify a number of times that the object has been incorrectly identified as a threat—to determine a counterweight value, which can be a static value or a dynamic value. A subsequent computation of risk score for the object can then be downscaled using the counterweight value, which in turn directly reduces the likelihood of a false positive threat alert being generated for the particular object (because, e.g., a lower computed risk score may not satisfy the threshold that results in a particular object being deemed as posing a threat). When the object triggers another false positive threat alert, a new counterweight value can be determined using the same operations described above, and the new counterweight value can be less than or equal to the counterweight value used in an immediately preceding risk scoring iteration for the object.

The techniques described herein can be used in the context of network security and in particular, adjusting weights to compute risk scores and taking corrective actions based on the computed risk scores to reduce false positive threat alerts and to detect actual threats from even reliable endpoints before they compromise an entire network or system. One skilled in the art will appreciate that the techniques described herein are not limited to just this network security application but can be applicable in other contexts. For example, in some implementations, the techniques described herein can be used to reduce false positive threat alerts of fraudulent activity, for example, in credit card/bank account transactions. For this use case, each client's account(s) at a financial institution can have a corresponding risk score that is determined using multiple risk factors. When a client's (or the underlying account's) risk score exceeds a predetermined threshold, the client's account(s) can be investigated to determine any indication of fraudulent activity on the account(s). If it is a false positive threat alert, the techniques described herein can be applied to adjust the weight and the risk score of the client (or the underlying account) in subsequent risk scoring and threat assessments. In this way, the false positive threat alerts of fraudulent activity can be reduced. For brevity and ease of description, the following description is provided in the context of network security and threats posed by objects deployed in a networked environment; however, as noted above, the same description and associated techniques and methodology are applicable in other contexts and applications as well (particularly those in which false positive threat alerts are sought to be limited for certain objects/entities in a given environment).

Figure 1:
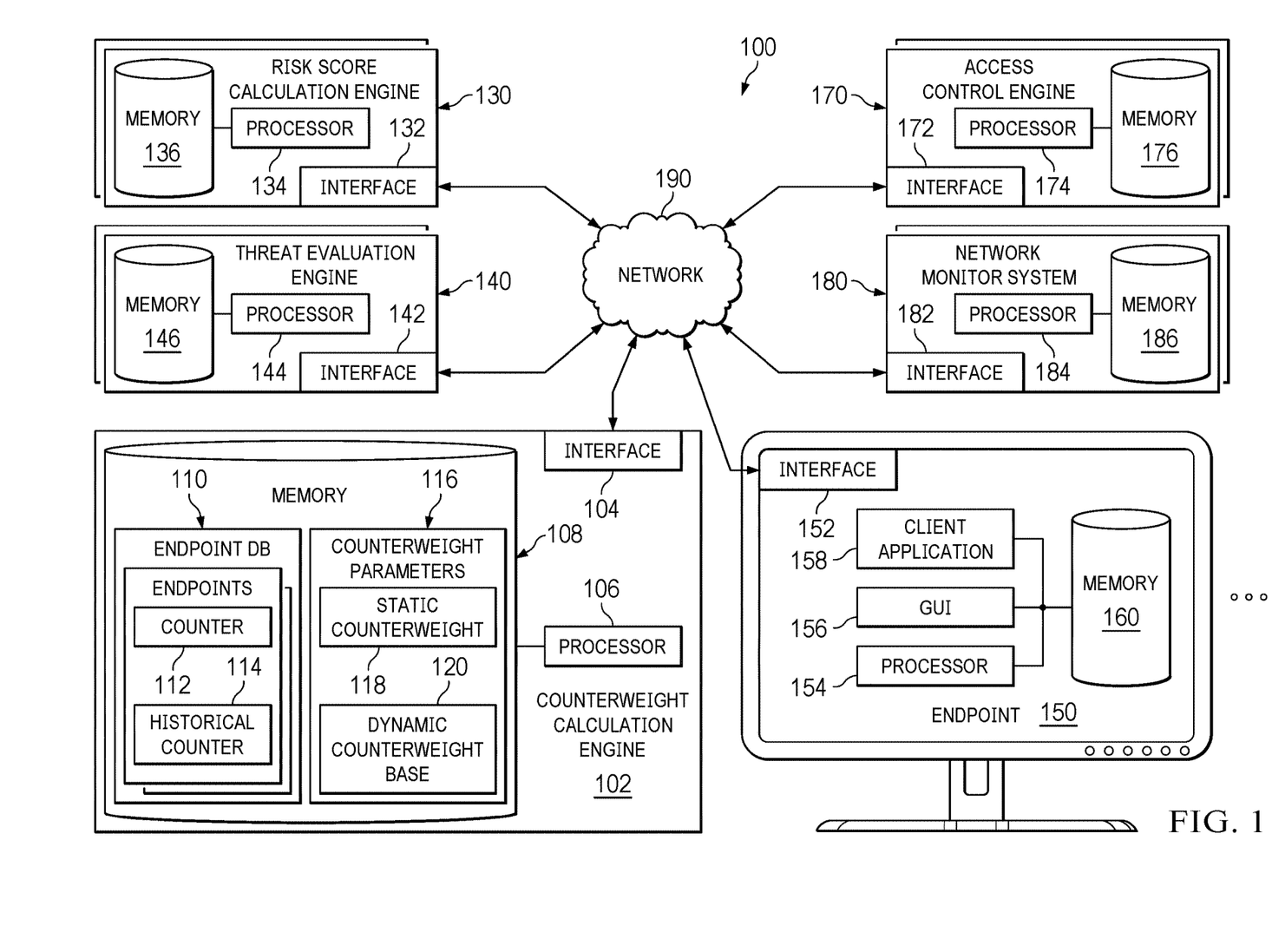
FIG. 1 is a block diagram of an example environment for monitoring risks posed by objects in a networked environment and taking appropriate actions for any threats posed by such objects.

Turning to the illustrated example implementation, FIG. 1 is a block diagram of an example networked environment 100 for monitoring risks posed by objects in a networked environment and taking appropriate actions for any threats posed by such objects. As further described with reference to FIG. 1, the environment implements various systems that interoperate to detect risks or threats posed by various objects in the network and take remediation or security actions in response to detected risks or threats (e.g., adjusting counterweights of objects, downscaling risk scores of objects, controlling access of the objects to system resources, etc.).

As shown in FIG. 1, the example environment 100 includes a counterweight calculation engine 102, a network monitor system 180, an access control engine 170, a risk score calculation engine 130, a threat evaluation engine 140, and multiple endpoints 150 that are interconnected over a network 190. The function and operation of each of these components is described below.

In some implementations, the illustrated implementation is directed to a solution where the network monitor system 180 can continuously monitor the activities of various objects (e.g., endpoints) in the network and detect the threat events (which are also simply referred to as events in this document) of such endpoints 150. As used in this specification, an object refers to an entity present in a networked environment, and can include, e.g., endpoints or user devices, user accounts associated with a particular provider or service, etc. The network monitor system 180 can transmit the detected threat events to the risk score calculation engine 130 over network 190. The risk score calculation engine 130 can compute a risk score for each of one or more endpoints 150 (e.g., by combining the number of threat events during a pre-determined period with the severity of those threat events).

In some implementations, the risk score calculation engine 130 can compute the risk score using the risk score calculation methods described in U.S. application Ser. No. 18/046,748, filed on Oct. 14, 2022, the content of which is incorporated herein by reference. An example risk scoring algorithm from the U.S. application Ser. No. 18/046,748 computes an aggregate risk score for an object (e.g., by combining the number of events during a pre-determined period with the severity of those events) in a networked environment, and then generates an intermediate score that adjusts the computed aggregate risk score based on one or more additional risk factors, such as a number of distinct use cases triggered during detected events, a number of MITRE attacks tactics used during the detected events, and a category of the object. The risk scoring algorithm scales the intermediate score based on a scaling function, such as the logarithmic sigmoid function to map the intermediate score to an overall risk score value that is within the range of 0 and 1.

In some implementations, the risk score calculation engine 130 can transmit, over the network 190, the risk score of the one or more endpoints 150 to the threat evaluation engine 140. The threat evaluation engine 140 can determine whether the overall risk for a particular endpoint 150 reflects an actual threat. In some implementations, the threat evaluation can include two steps—the first step determines whether the endpoint 150 poses a threat and the second step determines whether the threat is an actual threat. In the first step, the threat evaluation engine 140 can compare the risk score with a predetermined risk threshold value. If the risk score does not satisfy (e.g., meets or exceeds) the predetermined risk threshold value, the threat evaluation engine 140 can determine that the endpoint 150 poses a threat and then proceed to perform the second step of the threat evaluation. On the other hand, if the risk score satisfies (e.g., below) the predetermined risk threshold value, the threat evaluation engine 140 can determine that the endpoint 150 does not pose a threat and can skip the second step of the threat evaluation for the endpoint 150.

In the second step, the threat evaluation engine 140 can determine whether the threat is an actual threat based on, for example, analyzing the threat events that were relied on to calculate the risk score. In some instances, the threat events can be automatically analyzed to determine a likelihood that the threat is an actual threat. For example, a machine learning model can be trained to determine a likelihood that a threat is an actual threat. The machine learning model can be trained using multiple samples, where each sample includes, for example, a risk score, features associated with threat event(s) (e.g., a number of distinct use cases triggered during the threat events, a number of MITRE attacks tactics used during the threat events, etc.), and/or features associated with an endpoint (e.g., category of the endpoint, risk history of the endpoint, etc.) and a label indicating whether the threat is an actual threat. The threat evaluation engine 140 can then use the trained machine learning model to evaluate the likelihood that the endpoint 150 poses an actual threat. In another example, the threat evaluation engine 140 can send a threat assessment, including, for example, the risk score of the endpoint 150 and the threat events associated with the risk score, to a system administrator's system (not shown) where a human verifier can further evaluate whether the threat is an actual threat or not. The human verifier's determination of whether the endpoint 150 poses an actual threat can subsequently be provided (e.g., a message with a flag or indicator (0 or 1) indicating whether the endpoint 150 poses an actual threat or not) to the threat evaluation engine 140 and/or the access control engine 170.

In some implementations, the threat evaluation engine 140 sends the assessment of whether the endpoint 150 poses an actual threat (e.g., a message with a flag or indicator (0 or 1) indicating whether the endpoint 150 poses an actual threat or not), for example, to the access control engine 170. In some alternative implementations, the threat evaluation engine 140 can transmit the risk score and/or the threat events associated with the risk score to the access control engine 170, which in turn can determine (using the above-described operations) whether the endpoint 150 poses an actual threat.

In some implementations, the access control engine 170 can control access of the endpoint 150 to resources with the networked environment based on the determination of whether the endpoint 150 poses an actual threat or not. If the endpoint 150 is determined to pose an actual threat, the access control engine 170 can take a corrective action, e.g., in the form of restricting access of the endpoint 150 to resources within the networked environment. Alternatively, if the endpoint 150 is determined not to pose an actual threat, the access control engine 170 can take an action, e.g., in the form of enabling or granting the endpoint 150 access to resources within the networked environment.

In some cases, if the endpoint 150 is determined not to pose an actual threat, the counterweight calculation engine 102 can determine a counterweight that is applied to downscale a subsequent computation of a risk score for the object. Additional details about the methods of determining the counterweight are described in FIG. 3. The counterweight calculation engine 102 can then send the counterweight to the risk score calculation engine 130. When the risk score calculation engine 130 calculates another risk score for the endpoint 150 at a later time interval, the risk score calculation engine 130 can first determine a risk score for the endpoint 150 using the operations described above, and then downscale the risk score using the counterweight to obtain an updated risk score for the endpoint 150. Using the same operations described above, the threat evaluation engine 140 and/or the access control engine 170 can determine whether the endpoint 150 poses and actual threat based on the updated risk score, and the access control engine 170 can control access of the endpoint 150 to system resources accordingly.

As described above, and in general, the environment 100 enables the illustrated components to share and communicate information across devices and systems (e.g., counterweight calculation engine 102, network monitor system 180, access control engine 170, risk score calculation engine 130, threat evaluation engine 140, and endpoint 150, among others) via network 190. As described herein, the counterweight calculation engine 102, the network monitor system 180, the access control engine 170, the risk score calculation engine 130, the threat evaluation engine 140, and/or the endpoint 150 can be cloud-based components or systems (e.g., partially or fully), while in other instances, non-cloud-based systems can be used. In some instances, non-cloud-based systems, such as on-premise systems, client-server applications, and applications running on one or more client devices, as well as combinations thereof, can use or adapt the processes described herein. Although components are shown individually, in some implementations, functionality of two or more components, systems, or servers can be provided by a single component, system, or server. Conversely, functionality that is shown or described as being performed by one component, can be performed and/or provided by two or more components, systems, or servers.

As used in the present disclosure, the term "computer" is intended to encompass any suitable processing device. For example, the counterweight calculation engine 102, the network monitor system 180, the access control engine 170, the risk score calculation engine 130, the threat evaluation engine 140, and/or the endpoint 150 can be any computer or processing devices such as, for example, a blade server, general-purpose personal computer (PC), Mac®, workstation, UNIX-based workstation, or any other suitable device. Moreover, although FIG. 1 illustrates a single counterweight calculation engine 102, a single network monitor system 180, a single access control engine 170, a single risk score calculation engine 130, a single threat evaluation engine 140, and a single endpoint 150, any one of the counterweight calculation engine 102, the network monitor system 180, the access control engine 170, the risk score calculation engine 130, the threat evaluation engine 140, and/or the endpoint 150 can be implemented using a single system or more than those illustrated, as well as computers other than servers, including a server pool. In other words, the present disclosure contemplates computers other than general-purpose computers, as well as computers without conventional operating systems.

Similarly, the endpoint 150 can be any system that can request data and/or interact with the counterweight calculation engine 102, the network monitor system 180, the access control engine 170, the risk score calculation engine 130, and/or the threat evaluation engine 140. The endpoint 150, also referred to as client device 150, in some instances, can be a desktop system, a client terminal, or any other suitable device, including a mobile device, such as a smartphone, tablet, smartwatch, or any other mobile computing device. In general, each illustrated component can be adapted to execute any suitable operating system, including Linux, UNIX, Windows, Mac OS®, Java™, Android™, Windows Phone OS, or iOS™, among others. The endpoint 150 can include one or more merchant- or financial institution-specific applications executing on the endpoint 150, or the endpoint 150 can include one or more web browsers or web applications that can interact with particular applications executing remotely from the endpoint 150, such as applications on the counterweight calculation engine 102, the network monitor system 180, the access control engine 170, the risk score calculation engine 130, and/or the threat evaluation engine 140, among others.

As illustrated, the counterweight calculation engine 102 includes or is associated with interface 104, processor(s) 106, and memory 108. While illustrated as provided by or included in the counterweight calculation engine 102, parts of the illustrated components/functionality of the counterweight calculation engine 102 can be separate or remote from the counterweight calculation engine 102, or the counterweight calculation engine 102 can itself be distributed across the network 190.

The interface 104 of the counterweight calculation engine 102 is used by the counterweight calculation engine 102 for communicating with other systems in a distributed environment—including within the environment 100—connected to the network 190, e.g., the network monitor system 180, the access control engine 170, the risk score calculation engine 130, the threat evaluation engine 140, the endpoint 150, and other systems communicably coupled to the illustrated counterweight calculation engine 102 and/or network 190. Generally, the interface 104 comprises logic encoded in software and/or hardware in a suitable combination and operable to communicate with the network 190 and other components. More specifically, the interface 104 can comprise software supporting one or more communication protocols associated with communications such that the network 190 and/or interface's hardware is operable to communicate physical signals within and outside of the illustrated environment 100. Still further, the interface 104 can allow the counterweight calculation engine 102 to communicate with the network monitor system 180, the access control engine 170, the risk score calculation engine 130, the threat evaluation engine 140, the endpoint 150, and/or other portions illustrated within the counterweight calculation engine 102 to perform the operations described herein.

The counterweight calculation engine 102, as illustrated, includes one or more processors 106. Although illustrated as a single processor 106 in FIG. 1, multiple processors can be used according to particular needs, desires, or particular implementations of the environment 100. Each processor 106 can be a central processing unit (CPU), an application specific integrated circuit (ASIC), a field-programmable gate array (FPGA), or another suitable component. Generally, the processor 106 executes instructions and manipulates data to perform the operations of the counterweight calculation engine 102. Specifically, the processor 106 executes the algorithms and operations described in the illustrated figures, as well as the various software modules and functionality, including the functionality for sending communications to and receiving transmissions from the network monitor system 180, the access control engine 170, the risk score calculation engine 130, the threat evaluation engine 140, and/or the endpoint 150, as well as to other devices and systems. Each processor 106 can have a single or multiple cores, with each core available to host and execute an individual processing thread. Further, the number of, types of, and particular processors 106 used to execute the operations described herein can be dynamically determined based on a number of requests, interactions, and operations associated with the counterweight calculation engine 102.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component can be fully or partially written or described in any appropriate computer language including, e.g., C, C++, JavaScript, Java™, Visual Basic, assembler, Perl®, any suitable version of 4GL, as well as others.

As illustrated, the counterweight calculation engine 102 can also include memory 108, which can represent a single memory or multiple memories. The memory 108 can include any memory or database module and can take the form of volatile or non-volatile memory including, without limitation, magnetic media, optical media, random access memory (RAM), read-only memory (ROM), removable media, or any other suitable local or remote memory component. The memory 108 can store various objects or data associated with the counterweight calculation engine 102, including any parameters, variables, algorithms, instructions, rules, constraints, or references thereto. While illustrated within the counterweight calculation engine 102, memory 108 or any portion thereof, including some or all of the particular illustrated components, can be located remote from the counterweight calculation engine 102 in some instances, including as a cloud application or repository, or as a separate cloud application or repository when the counterweight calculation engine 102 itself is a cloud-based system. As illustrated, memory 108 includes an endpoint database 110 and counterweight parameters 116. The endpoint database 110 can store various data associated with endpoint(s), including each endpoint's counter 112 (e.g., the second counter as described in FIG. 3) and historical counter 114 (e.g., the historical counter as described in FIG. 3). The counter 112 can be used to determine an action to be performed on an endpoint, for example, resetting risk score, adjusting counterweights, etc. The historical counter 114 can keep track of the number of times that an endpoint has been incorrectly identified as posing a threat to the networked environment (i.e., the number of times that the object has triggered a false positive threat alert in the past). The counterweight parameters 116 can include one or more static counterweight 118 (e.g., the static value of a counterweight as described in FIG. 3), and one or more dynamic counterweight base 120 (e.g., the initial counterweight value as described in FIG. 3). The static counterweight 118 and the dynamic counterweight base 120 can be used to compute counterweights, as described with more details in FIG. 3.

Network 190 facilitates wireless or wireline communications between the components of the environment 100 (e.g., between the counterweight calculation engine 102, the network monitor system 180, the access control engine 170, the risk score calculation engine 130, the threat evaluation engine 140, the endpoint 150, etc.), as well as with any other local or remote computers, such as additional mobile devices, clients, servers, or other devices communicably coupled to network 190, including those not illustrated in FIG. 1. In the illustrated environment, the network 190 is depicted as a single network, but can be comprised of more than one network without departing from the scope of this disclosure, so long as at least a portion of the network 190 can facilitate communications between senders and recipients. In some instances, one or more of the illustrated components (e.g., the counterweight calculation engine 102, the network monitor system 180, the access control engine 170, the risk score calculation engine 130, the threat evaluation engine 140, the endpoint 150, etc.) can be included within or deployed to network 190 or a portion thereof as one or more cloud-based services or operations. The network 190 can be all or a portion of an enterprise or secured network, while in another instance, at least a portion of the network 190 can represent a connection to the Internet. In some instances, a portion of the network 190 can be a virtual private network (VPN). Further, all or a portion of the network 190 can comprise either a wireline or wireless link. Example wireless links can include 802.11a/b/g/n/ac, 802.20, WiMax, LTE, and/or any other appropriate wireless link. In other words, the network 190 encompasses any internal or external network, networks, sub-network, or combination thereof operable to facilitate communications between various computing components inside and outside the illustrated environment 100. The network 190 can communicate, for example, Internet Protocol (IP) packets, Frame Relay frames, Asynchronous Transfer Mode (ATM) cells, voice, video, data, and other suitable information between network addresses. The network 190 can also include one or more local area networks (LANs), radio access networks (RANs), metropolitan area networks (MANs), wide area networks (WANs), all or a portion of the Internet, and/or any other communication system or systems at one or more locations.

As noted, the network monitor system 180 can continuously monitor activities of endpoint(s) 150 and detect threat events of the endpoint(s) 150. In some examples, the network monitor system 180 can store the detected threat events of the endpoint(s) 150 (e.g., in memory 186) and transmit, to the risk score calculation engine 130, the detected threat events periodically (e.g., every 30 days, every 7 days, etc.). In some examples, the network monitor system 180 can transmit, to the risk score calculation engine 130, immediately upon the occurrence of a particular threat event (e.g., a particular anomalous behavior pattern) of the endpoint(s) 150. As illustrated, the network monitor system 180 includes various components, including interface 182 for communication (which can be operationally and/or structurally similar to interface 104), at least one processor 184 (which can be operationally and/or structurally similar to processor(s) 106, and which can execute the functionality of the network monitor system 180), and at least one memory 186 (which can be operationally and/or structurally similar to memory 108).

As noted, the access control engine 170 can take corrective or remedial actions, such as, e.g., controlling access of the endpoint(s) 150 to the various system resources of the networked environment 100. In some examples, the access control engine 170 can restrict access of an endpoint to resources within the networked environment, if the endpoint is determined to pose an actual threat. Alternatively, the access control engine 170 can grant access of an endpoint to resources within the networked environment, if the endpoint is determined not to pose an actual threat. As illustrated, the access control engine 170 includes various components, including interface 172 for communication (which can be operationally and/or structurally similar to interface 104), at least one processor 174 (which can be operationally and/or structurally similar to processor(s) 106, and which can execute the functionality of the access control engine 170), and at least one memory 176 (which can be operationally and/or structurally similar to memory 108).

The networked environment 100 can also include one or more risk score calculation engine 130 that can compute risk scores for endpoint(s) 150. In some implementations, the risk score calculation engine 130 can compute the risk scores using the risk score calculation methods described in U.S. application Ser. No. 18/046,748, filed on Oct. 14, 2022, the content of which is incorporated herein by reference. As illustrated, the risk score calculation engine 130 includes various components, including interface 132 for communication (which can be operationally and/or structurally similar to interface 104), at least one processor 134 (which can be operationally and/or structurally similar to processor(s) 106, and which can execute the functionality of the risk score calculation engine 130), and at least one memory 136 (which can be operationally and/or structurally similar to memory 108).

As noted, the threat evaluation engine 140 can determine whether an endpoint 150 poses an actual threat or not. In some examples, the threat evaluation engine 140 can send threat assessment of the endpoint 150 to the access control engine 170, which can then control access of the endpoint 150 to system resources accordingly. Alternatively, the threat evaluation engine 140 can notify the counterweight calculation engine 102 to generate a counterweight for the endpoint 150, if the endpoint 150 is determined not to pose an actual threat (i.e., a false positive threat alert). As illustrated, the threat evaluation engine 140 includes various components, including interface 142 for communication (which can be operationally and/or structurally similar to interface 104), at least one processor 144 (which can be operationally and/or structurally similar to processor(s) 106, and which can execute the functionality of the threat evaluation engine 140), and at least one memory 146 (which can be operationally and/or structurally similar to memory 108).

As illustrated, one or more endpoints 150 can be present in the example environment 100. Although FIG. 1 illustrates a single endpoint 150, multiple endpoints can be deployed and in use according to the particular needs, desires, or particular implementations of the environment 100. Each endpoint 150 can be associated with a particular user (e.g., an employee or a customer of a financial institution), or can be associated with/accessed by multiple users, where a particular user is associated with a current session or interaction at the endpoint 150. Endpoint 150 can be a client device at which the user is linked or associated. As illustrated, the endpoint 150 can include an interface 152 for communication (which can be operationally and/or structurally similar to interface 104), at least one processor 154 (which can be operationally and/or structurally similar to processor 106), a graphical user interface (GUI) 156, a client application 158, and a memory 160 (similar to or different from memory 108) storing information associated with the endpoint 150.

The illustrated endpoint 150 is intended to encompass any computing device, such as a desktop computer, laptop/notebook computer, mobile device, smartphone, personal data assistant (PDA), tablet computing device, one or more processors within these devices, or any other suitable processing device. In general, the endpoint 150 and its components can be adapted to execute any operating system. In some instances, the endpoint 150 can be a computer that includes an input device, such as a keypad, touch screen, or other device(s) that can interact with one or more client applications, such as one or more mobile applications, including for example a web browser, a banking application, or other suitable applications, and an output device that conveys information associated with the operation of the applications and their application windows to the user of the endpoint 150. Such information can include digital data, visual information, or a GUI 156, as shown with respect to the endpoint 150. Specifically, the endpoint 150 can be any computing device operable to communicate with the counterweight calculation engine 102, the network monitor system 180, the access control engine 170, the risk score calculation engine 130, the threat evaluation engine 140, other end point(s), and/or other components via network 190, as well as with the network 190 itself, using a wireline or wireless connection. In general, the endpoint 150 comprises an electronic computer device operable to receive, transmit, process, and store any appropriate data associated with the environment 100 of FIG. 1.

The client application 158 executing on the endpoint 150 can include any suitable application, program, mobile app, or other component. Client application 158 can interact with the counterweight calculation engine 102, the network monitor system 180, the access control engine 170, the risk score calculation engine 130, the threat evaluation engine 140, other endpoint(s), or portions thereof, via network 190. In some instances, the client application 158 can be a web browser, where the functionality of the client application 158 can be realized using a web application or website that the user can access and interact with via the client application 158. In other instances, the client application 158 can be a remote agent, component, or client-side version of the counterweight calculation engine 102, or a dedicated application associated with the counterweight calculation engine 102. In some instances, the client application 158 can interact directly or indirectly (e.g., via a proxy server or device) with the counterweight calculation engine 102 or portions thereof. The client application 158 can be used to view, interact with, or otherwise transact data exchanges with the counterweight calculation engine 102, and to allow interactions for network monitoring and access control via the network monitor system 180 and the access control engine 170.

GUI 156 of the endpoint 150 interfaces with at least a portion of the environment 100 for any suitable purpose, including generating a visual representation of any particular client application 158 and/or the content associated with any components of the counterweight calculation engine 102, the network monitor system 180, the access control engine 170, the risk score calculation engine 130, the threat evaluation engine 140, and/or other endpoint 150. For example, the GUI 156 can be used to present screens and information associated with the risk score calculation engine 130 (e.g., one or more interfaces identifying computed risk scores and assessments of the endpoint 150) and interactions associated therewith, as well as network monitoring-related presentations associated with the network monitor system 180 (e.g., one or more interfaces confirming that monitoring data is being collected and being transmitted to the risk score calculation engine 130), threat evaluation-related presentations associated with the threat evaluation engine 140 (e.g., one or more interfaces noting whether the endpoint 150 poses an actual threat or not), and/or the access control-related presentations associated with the access control engine 170 (e.g., one or more interfaces noting whether access to a particular resource has been granted or denied). GUI 156 can also be used to view and interact with various web pages, applications, and web services located local or external to the endpoint 150. Generally, the GUI 156 provides the user with an efficient and user-friendly presentation of data provided by or communicated within the system. The GUI 156 can comprise a plurality of customizable frames or views having interactive fields, pull-down lists, and buttons operated by the user. In general, the GUI 156 is often configurable, supports a combination of tables and graphs (bar, line, pie, status dials, etc.), and is able to build real-time portals, application windows, and presentations. Therefore, the GUI 156 contemplates any suitable graphical user interface, such as a combination of a generic web browser, a web-enable application, intelligent engine, and command line interface (CLI) that processes information in the platform and efficiently presents the results to the user visually.

While portions of the elements illustrated in FIG. 1 are shown as individual components that implement the various features and functionality through various objects, methods, or other processes, the software can instead include a number of sub-modules, third-party services, components, libraries, and such, as appropriate. Conversely, the features and functionality of various components can be combined into single components as appropriate.

Figure 2:
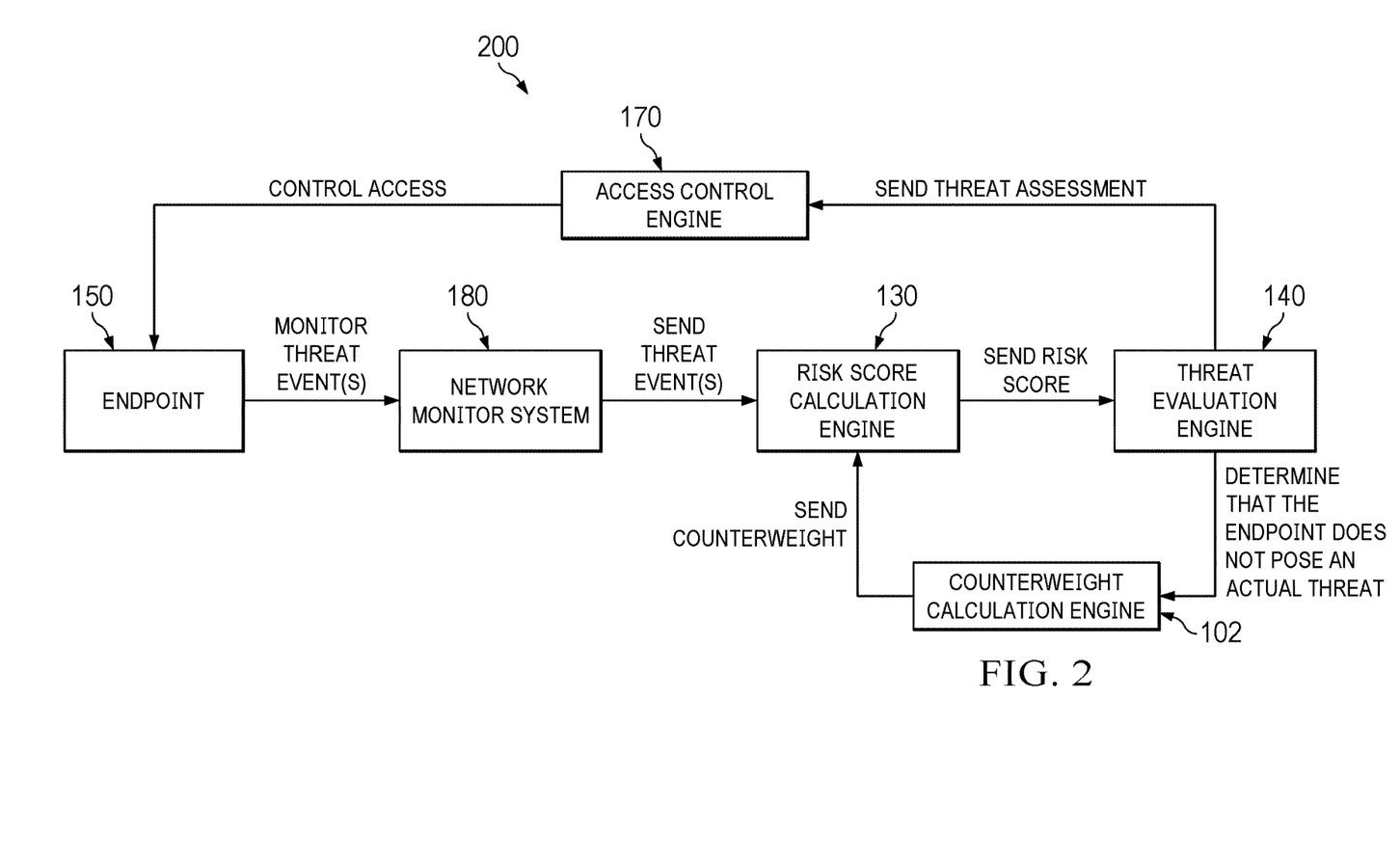
FIG. 2 illustrates a data and control flow of example interactions performed for monitoring risks posed by objects in a networked environment and taking appropriate actions for any threats posed by such objects.

FIG. 2 illustrates a data and control flow of example interactions 200 performed for monitoring risks posed by objects in a networked environment and taking appropriate actions for any threats posed by such objects, such as the networked environment 100. As explained further below, this flow diagram describes identifying a counterweight for an object (e.g., an endpoint) when the object is determined not to pose an actual threat, and subsequently controlling access of the object to system and network resources, based on downscaling risk score of the object using the identified counterweight. As illustrated, FIG. 2 shows interactions between the endpoint 150, the network monitor system 180, the risk score calculation engine 130, the threat evaluation engine 140, the counterweight calculation engine 102, and the access control engine 170.

As illustrated in FIG. 2, the network monitor system 180 monitors activities of various objects (including endpoint 150) in the networked environment, and detects the threat events correspond to the endpoint 150. In some instances, the network monitor system 180 can store the detected threat events for each object (including endpoint 150), and transmit, to the risk score calculation engine 130, the detected threat events of the various objects, including endpoint 150 periodically (e.g., every 30 days, every 7 days, etc.). In some instances, the network monitor system 180 can transmit, to the risk score calculation engine 130, immediately upon the detection of a particular threat event of the endpoint 150 (e.g., a particular anomalous behavior pattern). For ease of reference and discussion, the following description describes the operations of the network monitor system 180, the risk score calculation engine 130, the threat evaluation engine 140, the counterweight calculation engine 102, and the access control engine 170, as being performed with respect to a particular object, namely endpoint 150. However, it will be understood that the same operations would be performed for other monitored objects in the networked environment 100.

After obtaining the threat events of the endpoint 150 from the network monitor system 180, the risk score calculation engine 130 can compute a risk score based on the threat events. In some implementations, the risk score calculation engine 130 can compute the risk score using the risk score calculation methods described in U.S. application Ser. No. 18/046,748, filed on Oct. 14, 2022, the content of which is incorporated herein by reference. After determining the risk score for the endpoint 150, the risk score calculation engine 130 can send the risk score to the threat evaluation engine 140.

After receiving the risk score, the threat evaluation engine 140 can perform threat evaluation to determine whether the endpoint 150 poses an actual threat. In some instances, the threat evaluation can include two steps—the first step determines whether the endpoint 150 poses a threat and the second step determines whether the threat is an actual threat. In the first step, the threat evaluation engine 140 can compare the risk score (which can be a value in the range 0.0 to 1.0) with a predetermined risk threshold value. If the risk score does not satisfy (e.g., meets or exceeds) the predetermined risk threshold value (e.g., 0.5), the threat evaluation engine 140 can determine that the endpoint 150 poses a threat and then proceed to perform the second step of the threat evaluation. On the other hand, if the risk score satisfies (e.g., below) the predetermined risk threshold value, the threat evaluation engine 140 can determine that the endpoint 150 does not pose a threat and can skip the second step of the threat evaluation for the endpoint 150.

In the second step, the threat evaluation engine 140 can determine whether the threat is an actual threat based on, for example, analyzing the threat events that were relied on to calculate the risk score. In some instances, the threat events can be automatically analyzed to determine a likelihood that the threat is an actual threat. For example, a machine learning model can be trained to determine a likelihood that a threat is an actual threat. The machine learning model can be trained using multiple samples, where each sample includes, for example, a risk score, features associated with threat event(s) (e.g., a number of distinct use cases triggered during the threat events, a number of MITRE attacks tactics used during the threat events, etc.), and/or features associated with an endpoint (e.g., category of the endpoint, risk history of the endpoint, etc.) and a label indicating whether the threat is an actual threat. The threat evaluation engine 140 can then use the trained machine learning model to evaluate the likelihood that the endpoint 150 poses an actual threat. In another example, the threat evaluation engine 140 can send a threat assessment, including, for example, the risk score of the endpoint 150 and the threat events associated with the risk score, to a system administrator's system (not shown) where a human verifier can further evaluate whether the threat is an actual threat or not. The human verifier's determination of whether the endpoint 150 poses an actual threat can subsequently be provided (e.g., a message with a flag or indicator (0 or 1) indicating whether the endpoint 150 poses an actual threat or not) to the threat evaluation engine 140 and/or the access control engine 170.

Whether the endpoint 150 poses an actual threat or not, the threat evaluation engine 140 sends the assessment of whether the endpoint 150 poses an actual threat (e.g., a message with a flag or indicator (0 or 1) indicating whether the endpoint 150 poses an actual threat or not), for example, to the access control engine 170. In some alternative implementations, the threat evaluation engine 140 can transmit the risk score and/or the threat events associated with the risk score to the access control engine 170, which in turn can determine (using the above-described operations) whether the endpoint 150 poses an actual threat.

In some implementations, the access control engine 170 can control access of the endpoint 150 to resources with the networked environment based on the determination of whether the endpoint 150 poses an actual threat or not. If the endpoint 150 is determined to pose an actual threat, the access control engine 170 can take a corrective action, e.g., in the form of restricting access of the endpoint 150 to resources within the networked environment. Alternatively, if the endpoint 150 is determined not to pose an actual threat, the access control engine 170 can take an action, e.g., in the form of enabling or granting the endpoint 150 access to resources within the networked environment.

Figure 3:
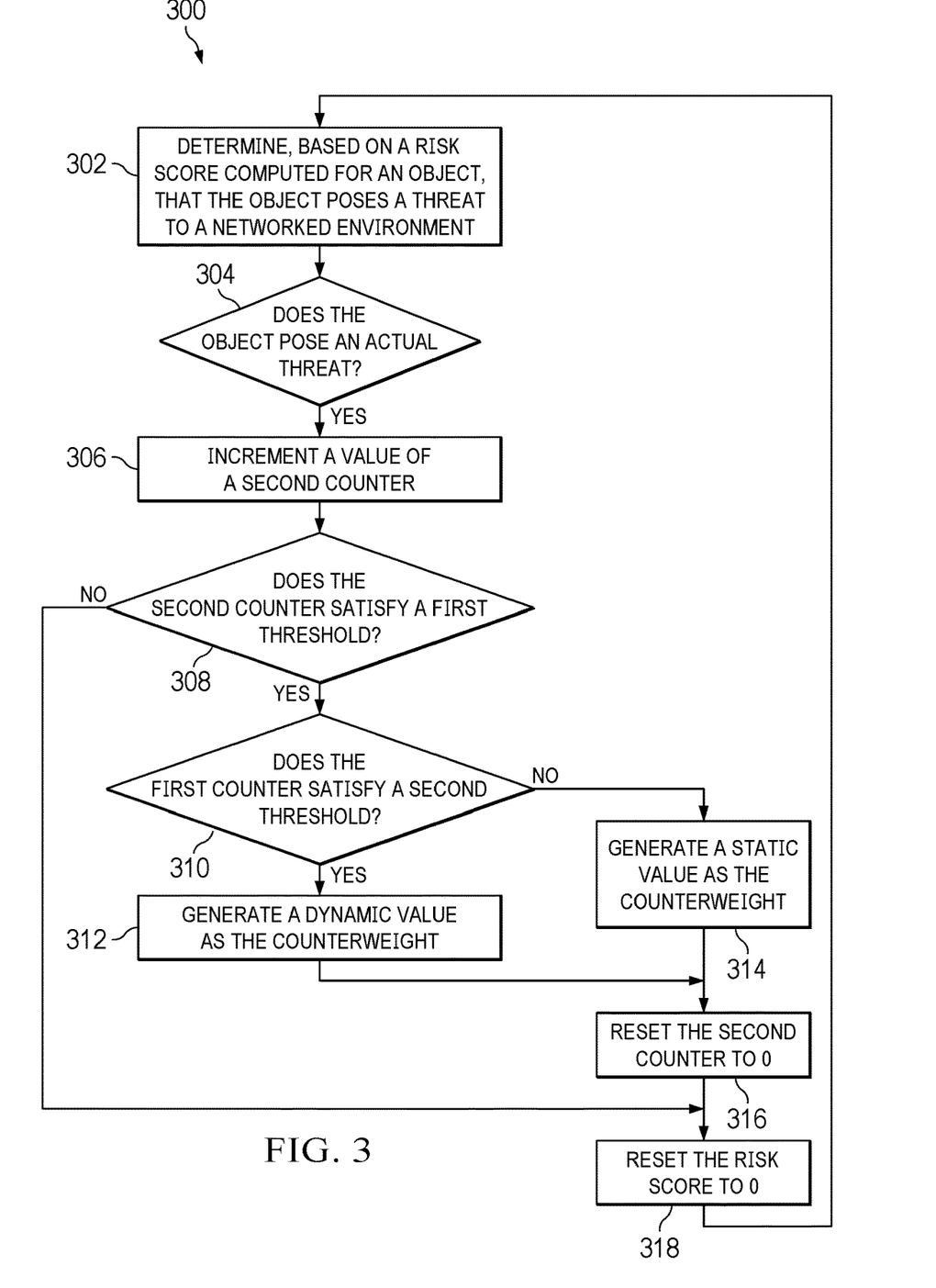
FIG. 3 is a flow diagram of an example method for reducing the occurrence of false positive threat alerts triggered by objects in a networked environment.

In some cases, if the endpoint 150 is determined not to pose an actual threat, the counterweight calculation engine 102 can determine a counterweight using the operations described in FIG. 3. The counterweight calculation engine 102 can then send the counterweight to the risk score calculation engine 130. When the risk score calculation engine 130 calculates another risk score for the endpoint 150 at a later time interval, the risk score calculation engine 130 can first determine a risk score for the endpoint 150 using the operations described above, and then downscale the risk score using the counterweight to obtain an updated risk score for the endpoint 150. Using the same operations described above, the threat evaluation engine 140 and/or the access control engine 170 can determine whether the endpoint 150 poses and actual threat based on the updated risk score, and the access control engine 170 can control access of the endpoint 150 to system resources accordingly.

It should be noted that FIG. 2 only provides an example of the flows and interactions between an example set of components performing the operations described herein. Additional, alternative, or different combinations of components, interactions, and operations can be used in different implementations.

FIG. 3 is a flow diagram of an example method 300 for reducing the occurrence of false positive threat alerts triggered by objects in a networked environment, such as the networked environment 100. As explained further below, this flow diagram describes identifying a counterweight for an object (e.g., an endpoint) when the object is determined not to pose an actual threat, and subsequently controlling access of the object to system and network resources, based on downscaling risk score of the object using the identified counterweight. It should be understood that method 300 can be performed, for example, by any suitable system, environment, software, and hardware, or a combination of systems, environments, software, and hardware as appropriate. In some instances, method 300 can be performed by a threat detection system including one or more components of the environment 100, including, among others, the threat evaluation engine 140, the counterweight calculation engine 102, and the access control engine 170, or portions thereof, described in FIG. 1, as well as other components or functionality described in other portions of this description. In other instances, the method 300 can be performed by a plurality of connected components or systems, such as those illustrated in FIG. 2. Any suitable system(s), architecture(s), or application(s) can be used to perform the illustrated operations.

In one instance, method 300 describes a method performed for one or more objects in a computer network at a predetermined interval (e.g., every 30 days, every 7 days, etc.). The object can be, for example, the endpoint 150 described in FIG. 1. In other instances, the method can be performed for the one or more objects upon the occurrence of a particular event (e.g., detecting a particular anomalous behavior pattern of an object).

At 302, a threat detection system can determine, at a first time interval, for an object that is deployed within a networked environment and based on a first risk score computed for the object, that the object poses a threat to the networked environment. In some cases, a risk score can be computed for each of the one or more objects in a computer network at a predetermined interval (e.g., every 30 days, every 7 days, etc.).

In some instances, the threat detection system can obtain threat events of the object and compute a risk score based on the threat events. Examples of threat events include, among others, detection of viruses, detection of ransomware, and detection of malicious actors attempting to gain unauthorized access to computer systems and networks. In some implementations, the risk score can be computed using the risk score calculation methods described in U.S. application Ser. No. 18/046,748, filed on Oct. 14, 2022, the content of which is incorporated herein by reference.

In some cases, the threat detection system can determine that the object does not pose a threat to the networked environment if the risk score satisfies (e.g., below) a predetermined risk threshold value. On the other hand, if the risk score does not satisfy the predetermined risk threshold value, the object can be determined to pose a threat.

At 304, whether the object poses an actual threat can be determined. In some cases, whether the object poses an actual threat can be determined based on, for example, analyzing the threat events that were relied on to calculate the risk score. Then, actual threat data indicating whether the object poses an actual threat to the networked environment can be generated and sent to the threat detection system. In some instances, the actual threat data can be, for example, a message with a flag or indicator (0 or 1) indicating whether the object poses an actual threat or not. For example, 1 can represent that the object poses an actual threat (i.e., true positive), whereas 0 can represent that the object does not pose an actual threat (i.e., false positive). The determination of whether the object poses an actual threat can be made in the manner described above with reference to FIG. 2, so the details are omitted here for brevity and ease of description.

In some cases, if the object is determined not to pose an actual threat, the threat detection system can take a corrective action, e.g., in the form of restricting access of the object to resources within the networked environment. On the other hand, if the object is determined to pose an actual threat, the method 300 can proceed to 306.

At 306, the threat detection system can increment a value of a second counter. In some instances, in response to receiving the actual threat data indicating that the object does not pose an actual threat (i.e., a false positive), the threat detection system can increment (1) a value of a second counter and (2) a value of a historical counter that indicates a number of times that the object has been incorrectly identified by the threat detection system as a threat to the networked environment. For example, the threat detection system can increment each of the second counter and the historical counter by 1.

In some cases, the second counter (e.g., a variable named counter) can be an integer that ranges between 0 and a first threshold (e.g., 2). This variable can be used to determine an action, for example, resetting risk score, adjusting counterweights, etc. The historical counter (e.g., a variable named history counter) can be represented as an integer and this variable indicates the number of times that an object has been incorrectly identified as posing a threat to the networked environment (i.e., the number of times that the object has triggered a false positive threat alert in the past).

At 308, the threat detection system can determine whether the second counter satisfies (e.g., meets or exceeds) the first threshold. In some cases, the first threshold can be a predetermined value (e.g., 2). If the second counter satisfies the first threshold (e.g., counter>=2), the method 300 can proceed to 310. Otherwise (e.g., if counter<2), the method 300 can proceed to 318.

At 310, the threat detection system can determine whether the value of a first counter (e.g., a variable named N) satisfies (e.g., meets or exceeds) a second threshold. In some cases, the second threshold can be a predetermined value (e.g., 1). In some cases, the value of the first counter can be computed by scaling the value of the historical counter by a predetermined value, such as dividing the value of the historical counter by the predetermined value (e.g., 2), which can be represented by the following equation:

$$N = \frac{\text{history counter}}{m}.$$

The variable N can be represented as an integer and indicates the number of times the second counter has reached a value of the first threshold (e.g., 2). The variable N can be used to determine the updates to the counterweights, as discussed further below. The variable m is the predetermined value (e.g., 2).

In some implementations, if the first counter satisfies (e.g., meets or exceeds) the second threshold (e.g., if N>1), the method 300 can proceed to 312. Otherwise (e.g., if N<=1), the method 300 can proceed to 314.

Each counter described above serves one or more purposes. In some implementations, the historical count can indicate a number of times that the object has been incorrectly identified by the threat detection system as a threat to the networked environment. The first counter, together with the second threshold, can be used to, for example, control a quantity of false positive threat alerts under which a counterweight is not generated. For example, assuming that the first counter satisfies the second threshold if the first counter is greater than 1 and that the first counter is computed by $$N = \frac{\text{history counter}}{2},$$

then a counterweight would not be generated for the first two false positive threat alerts, but would be generated from the third positive alert. In this way, before an object's risk score is downscaled, the object needs to accumulate a certain number of false positive threat alerts. The reason of setting this condition is that the first few false positive threat alerts triggered by an object may not be sufficient to indicate that the object is trustworthy. By adjusting the formula for computing the first counter and/or the second threshold, a standard of determining whether an object is trustworthy can be flexibly adjusted. The second counter, together with the first threshold, can be used to, for example, more gradually determine the counterweight to be applied instead of just reducing the counterweight each time a false positive is triggered. This allows for subsequent risk computations to not be downgraded relatively quickly, such that any subsequent actual threats would go undetected. As an example, assuming that the second counter satisfies the first threshold if the second counter is greater than or equal to 2, a lower counterweight would be generated for every two positive alerts, instead of for every positive alert.

At 312, the threat detection system can generate a dynamic value as the counterweight. In some implementations, the dynamic value can be computed using the following formula:

counter_updated_weight=counter_weight$^N$.

In this formula, the variable counter_weight represents an initial or current counterweight value, the variable counter_updated_weight represents the dynamic counterweight value, and the variable N represents the first counter as described above. In some cases, the initial counterweight value is less than 1, so the current counterweight value will be also less than 1 and will decrease with the increase of N. As an example, assuming that the initial or current counterweight value is 0.95, a dynamic counterweight value computed when N=2 would be 0.952 or 0.9025. As illustrated by the formula, a counterweight value is less than or equal to the counterweight value used in an immediately preceding risk scoring iteration for the object.

At 314, the threat detection system can generate a static value as the counterweight. In some implementations, the static value can be greater than or equal to the dynamic counterweight value described above. For example, the static value can be the same as the initial/current counterweight value (e.g., 0.95) as used in the dynamic counterweight value calculations.

At 316, the threat detection system can reset the second counter to zero. Therefore, in some implementations, whether a static value or a dynamic value is identified as the counterweight, the value of the second counter is reset to zero.

At 318, the threat detection system can reset the risk score to zero to enable a new computation of risk score for the object in a subsequent risk scoring iteration. At a second time interval later than the first time interval described above, the threat detection system can obtain a second risk score for the object using the operations described above. The second risk score can be downscaled, using the identified counterweight, to obtain the updated risk score for the object. In some implementations, downscaling the risk score using the identified counterweight includes multiplying the risk score by the identified counterweight. As an example, assuming that the first risk score is 0.75 and the determined counterweight is 0.95, the second risk score would be 0.75×0.95=0.7125, which is less than the first risk score (i.e., 0.75). Similar to the operations described above, the threat detection system can determine that the object does not pose a threat to the networked environment if the updated risk score satisfies (e.g., below) the predetermined risk threshold value. On the other hand, if the risk score does not satisfy the predetermined risk threshold value, the object can be determined to pose a threat.

Figure 4:
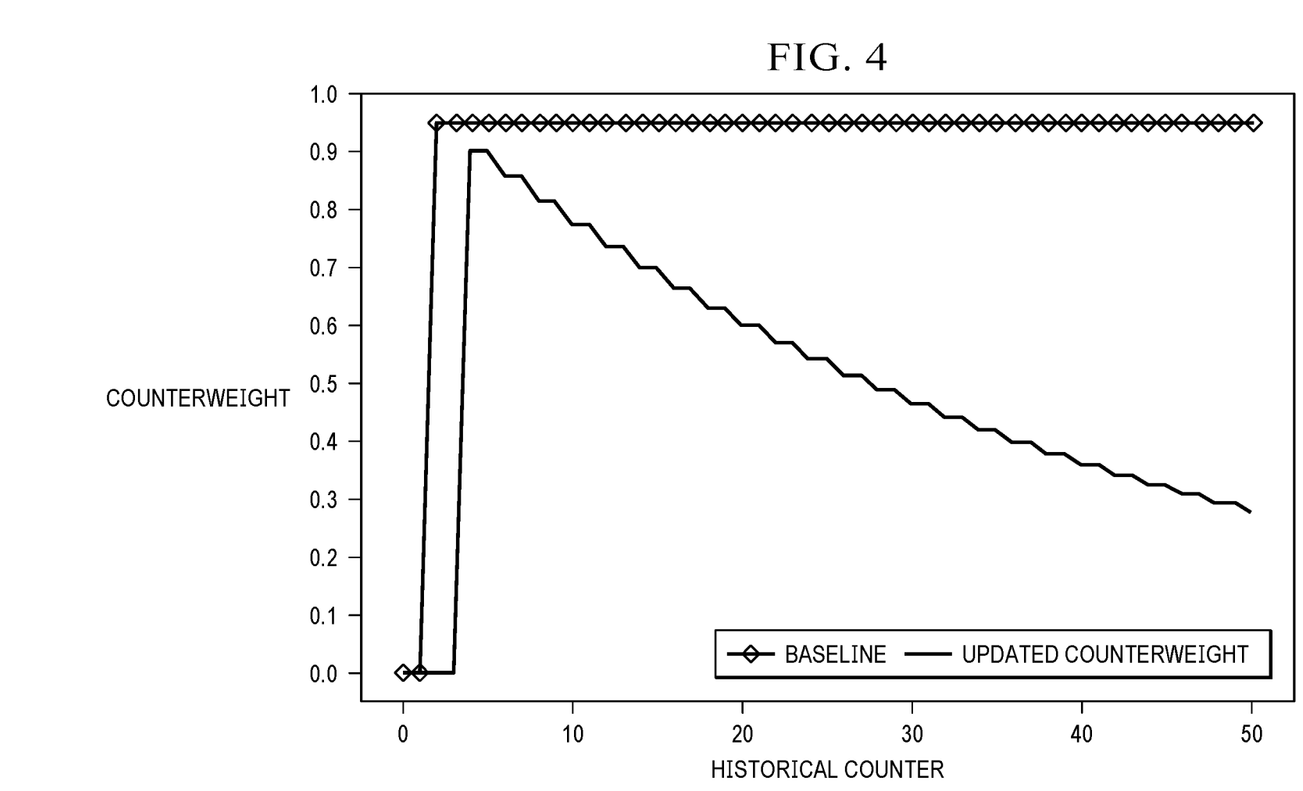
FIG. 4 illustrates example experiment results of an object's counterweight values for 50 consecutive false positive threat alerts.
Figure 5:
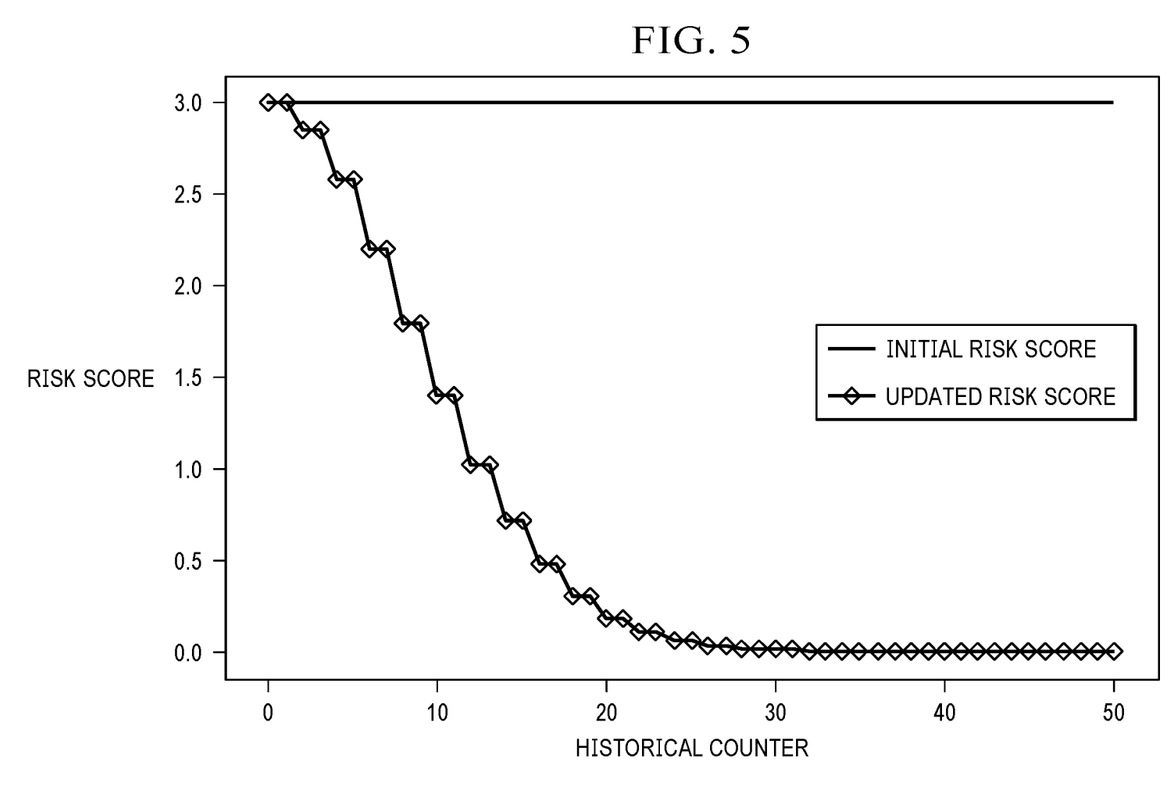
FIG. 5 illustrates example experiment results of an object's updated risk scores that are scaled by counterweights for 50 consecutive false positive threat alerts.

As illustrated by the formula for generating the dynamic value (i.e., counter_updated_weight=counter_weight$^N$), the value of the counterweight can progressively decrease, which in turn results in a reduction to the risk score scaled by using this counterweight value in each subsequent risk scoring iteration for the object. FIGS. 4-5 show experiment results to illustrate this.

FIG. 4 illustrates example experiment results of an object's counterweight values for 50 consecutive false positive threat alerts, where the counterweight values are computed using the method 300 as described in FIG. 3. In this example, the first threshold is 2 and the second counter satisfies the first threshold if the second counter is greater than or equal to 2. The second threshold is 1, the first counter satisfies the second threshold if the first counter is greater than 1, and the first counter is computed by $$N = \frac{\text{history counter}}{2}.$$

To compare with the declined counterweight values, FIG. 4 also illustrates a baseline scenario where the counterweight value is static (i.e., 0.95). Note that this scenario would not occur under method 300 (because the counterweight value under method 300 is a dynamic value when certain condition(s) is satisfied), but it is illustrated just to compare with the declined counterweight values. More specifically, the line labeled "BASELINE" is computed by method 300 excluding step 312, i.e., a dynamic value would not be generated as the counterweight. In contrast, the line labeled "UPDATED COUNTERWEIGHT" is computed by full method 300 using the parameters described above. As illustrated by the line labeled "UPDATED COUNTERWEIGHT" in FIG. 4, the counterweight value computed by method 300 progressively decreases with the increase of historical counter value (i.e., the number of false positive threat alerts triggered by the object).

FIG. 5 illustrates example experiment results of an object's updated risk scores that are scaled by counterweights for 50 consecutive false positive threat alerts, applying the dynamic counterweight values shown in FIG. 4. In this figure, it is assumed that the risk score in each false positive threat alert, before scaled by the corresponding counterweight, is the same as the updated risk score (i.e., risk score scaled by counterweight) in the prior false positive threat alert. In other words, different from method 300 where the risk score of the object is reset to zero in each iteration, the risk score of the object is not reset to zero in this experiment. To compare with the scaled risk scores, a line illustrating the risk score that is not scaled by the counterweights (i.e., 3.0) is also shown. In each false positive threat alert, the updated risk score is computed by multiplying the risk score by the counterweight. As illustrated by FIG. 5, the updated risk score scaled by counterweight exponentially decreases. Once the historical counter value is greater than 25, the updated risk score starts to approach zero. For example, when historical counter value is 26, the risk score before counterweight scaling is 0.054 and the corresponding counterweight value is 0.513. Therefore, the updated risk score is 0.0054×0.0513=0.028 (risk score multiplied by the counterweight).

Therefore, a corner case of the formula for generating the dynamic value (i.e., counter_updated_weight=counter_weight$^N$) can occur if an object causes many alerts, such that the counterweight would reach very low values, such as 0.513 when historical counter value is 26 as illustrated in FIGS. 4-5. This in turn would lead to proportionately low risk score values, such as 0.028 when historical counter value is 26 as illustrated in FIG. 5. To prevent this, a warning can be raised by the threat detection system when the counterweight becomes too low (e.g., if a computed risk score is below a particular threshold, such as 0.1), to prevent inaccurate reports of risk scores of 0 (i.e., a particular object does not pose any threat). For example, when the warning is triggered, the counterweight can be set to a pre-determined static value and then remain unchanged even if subsequent false positive threat alert occurs. As another example, the raised warning can trigger an investigation of the object to, for example, evaluate why the false positives are being generated and if appropriate (and upon resolution of issues), the risk score and the counterweight of the object can be reset.

Returning to FIG. 3, when the object is determined to pose a threat to the networked environment based on the second risk score, a new iteration of method 300 can be performed from 302. In addition, the threat detection system can perform one or more corrective actions, such as, e.g., suspending or limiting network access for that object, limiting access to one or more sensitive system resources, launching threat removal agents aimed at purging the detecting threat, triggering closer monitoring of the object, etc.

Alternatively, if the object is determined not to pose a threat to the networked environment, the threat detection system can control access of the object to system resources, including, for example, granting the object access to system resources.

The above description is provided in the context of network security and in particular, adjusting weights to compute risk scores and taking corrective actions based on the computed risk scores to reduce false positive threat alerts and to detect actual threats from even reliable endpoints before they compromise an entire network or system. One skilled in the art will appreciate that the above described techniques are not limited to just this network security application but can be applicable in other contexts. For example, in some implementations, the above described techniques can be used to reduce false positive threat alerts of fraudulent activity, for example, in credit card/bank account transactions. For this use case, each client's account(s) at a financial institution can have a corresponding risk score that is determined using multiple risk factors. When a client's (or the underlying account's) risk score exceeds a predetermined threshold, the client's account(s) can be investigated to determine any indication of fraudulent activity on the account(s). If it is a false positive threat alert, the techniques described herein can be applied to adjust the weight and the risk score of the client (or the underlying account) in subsequent risk scoring and threat assessments. In this way, the false positive threat alerts of fraudulent activity can be reduced.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   determining, by a threat detection system and at a first time interval, for an object that is deployed within a networked environment and based on a first risk score computed for the object, that the object poses a threat to the networked environment;
   receiving actual threat data indicating that the object does not pose an actual threat to the networked environment;
   in response to receiving the actual threat data, computing a value of a first counter based on prior incorrect identification of the object as a threat to the networked environment;
   identifying, based on the value of the first counter, a counterweight comprising, in response to receiving the actual threat data, incrementing (1) a value of a second counter and (2) a value of a historical counter that indicates a number of times that the object has been incorrectly identified by the threat detection system as a threat to the networked environment;
   downscaling, using the identified counterweight and at a second time interval, a second risk score for the object to obtain an updated risk score for the object;
   controlling access of the object to system resources based on whether the updated risk score satisfies a predetermined risk threshold value;
   computing the value of the first counter by scaling the value of the historical counter by a predetermined value; and
   determining whether the value of the second counter satisfies a first threshold and whether the value of the first counter satisfies a second threshold.

2. The computer-implemented method of claim 1, comprising:
   determining that the value of the second counter satisfies the first threshold and that the value of the first counter satisfies the second threshold; and in response to determining that the value of the second counter satisfies the first threshold and that the value of the first counter satisfies the second threshold, generating a dynamic value as the counterweight.

3. The computer-implemented method of claim 1, comprising:
determining that the value of the second counter satisfies the first threshold and that the value of the first counter does not satisfy the second threshold; and
in response to determining that the value of the second counter satisfies the first threshold and that the value of the first counter does not satisfy the second threshold, generating a static value as the counterweight.

4. The computer-implemented method of claim 1, comprising:
after identifying the counterweight, resetting the second counter to zero.

5. The computer-implemented method of claim 1, wherein controlling access of the object to the system resources based on whether the updated risk score satisfies the predetermined risk threshold value comprises:
determining that the updated risk score satisfies the predetermined risk threshold value; and
in response to determining that the updated risk score satisfies the predetermined risk threshold value, granting, to the object, access to system resources.

6. The computer-implemented method of claim 1, wherein controlling access of the object to the system resources based on whether the updated risk score satisfies the predetermined risk threshold value comprises:
determining that the updated risk score does not satisfy the predetermined risk threshold value; and
in response to determining that the updated risk score does not satisfy the predetermined risk threshold value, denying the object access to the system resources.

7. The computer-implemented method of claim 1, wherein downscaling, using the identified counterweight, the second risk score for the object to obtain the updated risk score for the object comprises:
obtaining, from the threat detection system and at the second time interval, the second risk score for the object; and
scaling the second risk score by the identified counterweight to obtain the updated risk score for the object.

8. A system comprising:
at least one memory storing instructions; and
at least one hardware processor interoperably coupled with the at least one memory, wherein execution of the instructions by the at least one hardware processor causes performance of operations comprising:
determining, by a threat detection system and at a first time interval, for an object that is deployed within a networked environment and based on a first risk score computed for the object, that the object poses a threat to the networked environment;
receiving actual threat data indicating that the object does not pose an actual threat to the networked environment;
in response to receiving the actual threat data, computing a value of a first counter based on prior incorrect identification of the object as a threat to the networked environment;
identifying, based on the value of the first counter, a counterweight comprising, in response to receiving the actual threat data, incrementing (1) a value of a second counter and (2) a value of a historical counter that indicates a number of times that the object has been incorrectly identified by the threat detection system as a threat to the networked environment;
downscaling, using the identified counterweight and at a second time interval, a second risk score for the object to obtain an updated risk score for the object;
controlling access of the object to system resources based on whether the updated risk score satisfies a predetermined risk threshold value;
computing the value of the first counter by scaling the value of the historical counter by a predetermined value; and
determining whether the value of the second counter satisfies a first threshold and whether the value of the first counter satisfies a second threshold.

9. The system of claim 8, the operations comprising:
determining that the value of the second counter satisfies the first threshold and that the value of the first counter satisfies the second threshold; and
in response to determining that the value of the second counter satisfies the first threshold and that the value of the first counter satisfies the second threshold, generating a dynamic value as the counterweight.

10. The system of claim 8, the operations comprising:
determining that the value of the second counter satisfies the first threshold and that the value of the first counter does not satisfy the second threshold; and
in response to determining that the value of the second counter satisfies the first threshold and that the value of the first counter does not satisfy the second threshold, generating a static value as the counterweight.

11. The system of claim 8, the operations comprising:
after identifying the counterweight, resetting the second counter to zero.

12. The system of claim 8, wherein controlling access of the object to the system resources based on whether the updated risk score satisfies the predetermined risk threshold value comprises:
determining that the updated risk score satisfies the predetermined risk threshold value; and
in response to determining that the updated risk score satisfies the predetermined risk threshold value, granting, to the object, access to system resources.

13. A non-transitory, computer-readable medium storing computer-readable instructions, that upon execution by at least one hardware processor, cause performance of operations, comprising:
determining, by a threat detection system and at a first time interval, for an object that is deployed within a networked environment and based on a first risk score computed for the object, that the object poses a threat to the networked environment;
receiving actual threat data indicating that the object does not pose an actual threat to the networked environment;
in response to receiving the actual threat data, computing a value of a first counter based on prior incorrect identification of the object as a threat to the networked environment;
identifying, based on the value of the first counter, a counterweight comprising, in response to receiving the actual threat data, incrementing (1) a value of a second counter and (2) a value of a historical counter that indicates a number of times that the object has been incorrectly identified by the threat detection system as a threat to the networked environment;

downscaling, using the identified counterweight and at a second time interval, a second risk score for the object to obtain an updated risk score for the object;

controlling access of the object to system resources based on whether the updated risk score satisfies a predetermined risk threshold value;

computing the value of the first counter by scaling the value of the historical counter by a predetermined value; and determining whether the value of the second counter satisfies a first threshold and whether the value of the first counter satisfies a second threshold.

14. The non-transitory, computer-readable medium of claim 13, the operations comprising:

determining that the value of the second counter satisfies the first threshold and that the value of the first counter satisfies the second threshold; and in response to determining that the value of the second counter satisfies the first threshold and that the value of the first counter satisfies the second threshold, generating a dynamic value as the counterweight.

15. The computer-implemented method of claim 1, comprising:

analyzing threat events used for calculating the first risk score by a trained machine learning model for determining the likelihood that the object poses an actual threat; and generating actual threat data based on the likelihood that the object poses an actual threat.

16. The system of claim 8, the operations comprising:

analyzing threat events used for calculating the first risk score by a trained machine learning model for determining the likelihood that the object poses an actual threat; and generating actual threat data based on the likelihood that the object poses an actual threat.

17. The non-transitory, computer-readable medium of claim 13, the operations comprising:

analyzing threat events used for calculating the first risk score by a trained machine learning model for determining the likelihood that the object poses an actual threat; and generating actual threat data based on the likelihood that the object poses an actual threat.

* * * * *